United States Patent Office 2,791,600
Patented May 7, 1957

2,791,600

RIGID THERMOPLASTIC COMPOSITIONS COMPRISING VINYL HALIDE POLYMERS WITH INTERPOLYMERS OF STYRENE AND ALKYL METHACRYLATES AND PROCESS OF MAKING

Edward G. Schwaegerle, Elyria, Ohio, assignor to The B. F. Goodrich Company, New York, N. Y., a corporation of New York No Drawing. Application June 1, 1954, Serial No. 433,828

11 Claims. (Cl. 260—45.5)

This invention relates to rigid, thermoplastic, vinyl halide compositions of improved physical and chemical properties and processability, and relates more particularly to hard, rigid thermoplastic, vinyl halide compositions comprising vinyl halide polymers with interpolymers of styrenes and alkyl methacrylates which are readily processable and which are highly resistant to corrosive chemicals.

Readily processable, plasticizer-free, thermoplastic, rigid vinyl halide compositions are known. Particularly outstanding examples are those described in Patent No. 2,646,417. Although highly useful, the rigid vinyl chloride compositions described in this patent are not as resistant to attack of corrosive chemicals as is desired. Accordingly, the objects of this invention are to provide rigid vinyl halide compositions which are readily processable, which are highly resistant to attack by corrosive chemicals such as concentrated sulfuric acid, and which retain the excellent properties of rigid vinyl halide polymers.

This invention now provides novel, rigid, thermoplastic, vinyl halide compositions which are readily processable without the necessity of adding the usual liquid plasticizers and which have excellent resistance to the corrosive effects of such strong chemical substances as concentrated sulfuric acid. The novel compositions of the invention comprise a major proportion of a vinyl halide polymer and a minor proportion of an interpolymer of styrene and alkyl methacrylate. Quite unexpectedly the rigid vinyl halide compositions of this invention have excellent clarity, are free from internal strains and possess an improved rate of the flow during molding. It is quite unusual that an interpolymer of styrene and alkyl methacrylate enhances the physical properties of rigid vinyl chloride compositions since polystyrene and polymethyl methacrylate are not compatible with polyvinyl chloride, and this incompatibility is evidence by opaque products resulting from a mixture of either one or both of polystyrene and polymethyl methacrylate with a polyvinyl chloride composition. Further, the addition of either or both of these polymer materials adversely affect the physical properties of the original polymer.

The vinyl halide resins which are utilized in the preparation of the compositions of this invention include all of the vinyl halide polymers composed predominately of polymerized vinyl halide and preferably all of the vinyl chloride polymers composed predominately of polymerized vinyl chloride. Thus, there may be utilized the homopolymers of the vinyl halides such as vinyl chloride and the multicomponent copolymers or interpolymers made from monomeric mixtures containing a vinyl halide and preferably vinyl chloride together with a lesser amount of other copolymerizable monoolefinic materials. Monoolefinic materials which may be interpolymerized with the vinyl chlorides include vinylidene halides such as vinylidene chloride and vinylidene bromide; vinyl esters such as vinyl acetate, vinyl propionate, vinyl butyrate, vinyl chloroacetate, vinyl chloropropionate, vinyl benzoate, vinyl chlorobenzoate and others; acrylic and alpha-alkyl acrylic acids, their alkyl esters, their amides and their nitriles such as acrylic acid, chloroacrylic acid, methacrylic acid, ethacrylic acid, methyl acrylate, ethyl acrylate, butyl acrylate, n-octyl acrylate, 2-ethylhexyl acrylate, n-decyl acrylate, methyl methacrylate, butyl methacrylate, methyl ethacrylate, ethyl ethacrylate, acrylamide, N-methyl acrylamide, N,N-dimethyl acrylamide, methacrylamide, N-methyl methacrylamide, N,N - dimethyl methacrylamide, acrylonitrile, chloroacrylonitrile, methacrylonitrile, ethacrylonitrile and others; vinyl aromatic compounds such as styrene, dichlorostyrene, vinyl naphthalene and others; alkyl esters of maleic and fumaric acid such as dimethyl maleate, diethyl maleate and others; vinyl alkyl ethers and ketone such as vinyl methyl ether, vinyl ethyl ether, vinyl isobutyl ether, 2-chloroethyl vinyl ether, methyl vinyl ketone, ethyl vinyl ketone, isobutyl vinyl ketone and others; and in addition, other monoolefinic materials as vinyl pyridine, N-vinyl carbazole, N-vinyl pyrrolidone, ethyl methylene malonate, isobutylene, ethylene, trichloroethylene, and various other readily polymerizable compounds containing a single olefinic double bond, especially those containing the $CH_2=C<$ group.

When utilizing such interpolymers or copolymers, the proportions of the various monomers in the monomeric mixtures polymerized to give the interpolymer may be varied considerably as long as the vinyl halide constitutes at least 50 weight percent of the total. For example, there may be used copolymers of 50 to 99 weight percent, or more preferably 70 to 95 weight percent vinyl chloride together with 1 to 50 weight percent, more preferably 5 to 30 weight percent of vinylidene chloride or a vinyl ester, or an acrylic or methacrylic ester or any of the other monoolefinic materials mentioned above, or any two, three or four of these. Tripolymers of 50 to 90 percent vinyl chloride, 5 to 45 percent vinylidene chloride and 5 to 45 percent of a vinyl ester such as vinyl acetate or vinyl benzoate, or an acrylic or methacrylic ester are further examples of vinyl chloride polymers which may be used.

The vinyl halide resin or polmer for use in the preparation of the compositions of this invention may be produced by any method known to the art such as by polymerization in solution, in mass or in aqueous medium. The preferred method of polymerization is in aqueous medium and most preferably in aqueous dispersion. When the aqueous medium contains an efficient emulsifying agent, the polymer is obtained in the form of a latex or dispersion. However, a preferred method is to prepare the vinyl chloride polymer in an aqueous medium containing a protective colloid or other surface-active agent in order to obtain an aqueous suspension of polymer in the form of fine uniform grains or "pearls." For the latter purpose, gelatin, casein, bentonite clay, starch derivatives, polyvinyl alcohol, polyacrylic acid or a salt thereof, hydrolyzed vinyl acetate polymers, and others may be utilized. When a polymeric emulsion is desired, the polymerization is carried out in the presence of an efficient emulsifying agent such as the fatty acid soaps including sodium oleate, potassium oleate, potassium palmitate, sodium myristate and the like; the hymolal sulfates such as sodium isopropyl naphthalene sulfonate, the sodium salts of alkyl benzene and alkyl naphthalene sulfonic acids, the sodium salt of n-octadecyl-N-1,2-dicarboxyethyl sulfosuccinamate and others.

The vinyl chloride polymer composition, as described, is a hard, rigid, but themoplastic material. Such compositions ordinarily have molecular weights greater than 40,000, it being understood that molecular weight determinations depend upon many factors of the test. However, an 0.4 percent solution of the vinyl chloride polymer in nitrobenzene preferably has a specific viscosity of from 0.30 to 0.70 and more preferably from about 0.40 to 0.60.

The styrene-alkyl methacrylate interpolymer for use in the compositions of this invention may be any polymer made from monomeric mixtures containing as the two essential monomers from 75 to 25 weight percent of styrene, a nuclear-substituted or alpha-substituted styrene derivative including such styrene derivatives as chloro-styrene, dichloro-styrene, vinyl toluene, alpha-methyl styrene, methoxy-styrene and the like; and from 25 to 75 weight percent of an aliphatic, alicyclic or aromatic methacrylate. Preferably employed are alkyl methacrylates wherein the alkyl group is methyl, ethyl, propyl, isopropyl, isobutyl, isoamyl or isohexyl; alicyclic methacrylates such as cyclohexyl methacrylate; phenyl methacrylate, benzyl methacrylate and the like, and methyl and ethyl ethacrylate and the like also may be employed in this invention. Other monomeric olefinic materials such as those described hereinbefore may be present in addition to the two essential monomers, but only in minor amounts of less than 20 weight percent of the total monomeric mixture. It is preferred to utilize a two-component monomeric mixture consisting of from about 60 to 40 weight percent of styrene and from about 40 to 60 weight percent of methyl methacrylate. In any case the styrene-alkyl methacrylate polymer should be hard, tough, thermoplastic and high in molecular weight. The molecular weight is preferably about 40,000 or greater.

The styrene-alkyl methacrylate interpolymer may be prepared by polymerization in solution, in mass or in an aqueous medium by suspension or emulsion polymerization techniques. The preferred aqueous polymerization medium may contain one of the above-mentioned colloidal or surface-active agents in order to obtain a suspension of the polymer or an efficient emulsifying agent to obtain a polymer dispersion or latex.

The amount of styrene-alkyl methacrylate interpolymer utilized in the vinyl halide compositions, although critical, may be varied considerably depending on the properties and processing characteristics desired in the final product. Generally an amount from 1 to 40 and preferably from 5 to 20 weight parts per 100 weight parts of vinyl halide polymer is sufficient to realize the advantages of the present invention. Preferably from 5 to 15 weight parts are ordinarily employed. In carrying out this invention the two resins are blended in any convenient manner such as blending powdered dry resins and then masticating the powder mixture until a homogeneous sheet is formed. The resins may be blended directly in internal mixers or on plastic mills by first working one resin until a homogeneous sheet is obtained, and then adding the other with further mastication until a homogeneous sheet is obtained. The intermixture of the two resins may be also accomplished by first dissolving each resin in a mutual solvent, mixing the solutions, and then precipitating the polymer blend. Preferably the two resins are prepared as separate aqueous dispersions which are blended and coagulated, or to polymerize the monomeric ingredients necessary for one resin and then adding the monomeric ingredients of the other and continuing the polymerization, in effect overpolymerizing the second resin particles on the first.

Regardless of the method by which the blending of the resins is accomplished, it is preferred that the blended resins be masticated or worked under heat and pressure to insure homogeneity. The homogeneous product resulting therefrom is readily processable without the need for adding other processing aids, has good clarity, very little color, is free from internal strains, has an improved rate of flow during molding operations, is resistant to the attack of corrosive chemicals such as concentrated sulfuric acid, and in addition possesses all the other outstanding physical and electrical properties of other rigid vinyl chloride compositions, and may be processed by molding, machining and the like.

To demonstrate a representative embodiment of the invention, in which parts are parts by weight; 100 parts of vinyl chloride, 190 parts of water, 0.5 part of a 50/50 mixture of gelatin and bentonite clay, and 0.15 part caprylyl peroxide are vigorously agitated in an autoclave at 300 to 400 R. P. M. and a temperature at about 50° C. until the vinyl chloride is converted into polyvinyl chloride in the form of minute particles in suspension. Thereafter the excess of vinyl chloride is vented and 5 parts of styrene, 5 parts of methyl methacrylate and 0.05 part of caprylyl peroxide are added to the polyvinyl chloride dispersion and the mixture heated to 70° C. for 4 hours in the autoclave. The resulting polymer product is cooled, washed, filtered and dried. The finely-divided polymer mixture is then transferred to a two-roll plastic mill having its rolls maintained at about 300° F. The polymer product fuses readily after several passes through the rolls, and a smooth rolling bank is attained. The rolls are opened slightly, and a smooth transparent sheet is removed from the mill. The time and temperature consumed in forming the polymer sheet are substantially less than that required to form a sheet of polyvinyl chloride alone with a liquid plasticizer. The powdery polymer may be extruded in the form of rods or rigid pipe having variable wall thicknesses as desired at temperatures much lower than those required for polyvinyl chloride alone or with small enough amounts of plasticizer to obtain a rigid product. The polymer composition may be calendered quite easily on a four-roll calender, having the calender rolls maintained at about 350° F. A plurality of calendered or molded sheets of the composition may be press molded into laminates several inches thick which may be machined, cut and otherwise formed.

Press molded sheets of the polymer composition have tensile strengths of 7,800 pounds per square inch, flexural strengths of 16,000 pounds per square inch, Izod impact values of 0.4 foot pounds per inch, sag temperatures of 170° F. and good impact resistance at low temperatures. The molded sheets are relatively clear, substantially color-free, have excellent flow properties for molding, and are particularly resistant to the corrosive effect of concentrated sulfuric acid. For comparative purposes, one of these sheets is placed in 66° Baumé sulfuric acid for 24 hours at 212° F. At the end of this time the sheets are measured and are found to have a 7 percent weight loss and a 6 percent volume loss. In contrast, a polymer mixture of 100 weight parts of polyvinyl chloride and 10 weight parts of a styrene-acrylonitrile copolymer of the type described in Patent No. 2,646,417, formed in the same manner and submitted to the same test, has a 27 percent weight loss and a 26 percent volume loss. The chemical resistance of the polymer compositions of this invention is outstanding and of particular importance in applications of rigid vinyl piping in the chemical industry where corrosive concentrated sulfuric acid at high temperatures must be handled. In addition, the compositions of this invention have unique properties not possessed by the ordinary plasticized vinyl halide resins, including improved electrical properties, improved heat and light stability and other physical properties. In addition, the compositions are capable of being processed at moderate temperatures which allow ease of handling and decrease the possibility of polymer breakdown, and can be drawn, racked, embossed, welded, machined and otherwise handled to form a variety of useful, rigid, chemically resistant thermoplastic products.

In addition to the procedure given above for preparing the polymer product, the styrene-methyl methacrylate copolymer may be made separately; for example, in suspension or emulsion. 50 parts of styrene and 50 parts of methyl methacrylate are mixed with 3 parts of decyl benzene sulfonate, 0.5 part sodium pyrophosphate, 0.25 part potassium persulfate and 200 parts of water and agitated at 40° C. to copolymerize the monomers which are mixed in this stage with a polyvinyl chloride suspension in a ratio of 10 parts of copolymer with 100 parts of polyvinyl chloride; or the styrene-methyl methacrylate copolymer latex may be dried to a fine powder and thoroughly mixed or blended with a fine dry powder of polyvinyl chloride, and the dry powder blend transferred to a plastic mill or other internal mixer for suitable mastication, resulting in a hard, rigid, readily processable plastic product. When the above embodiment of the invention is repeated with 5 or 20 parts of styrene-methyl methacrylate copolymer in ratios of from 60 to 40 parts of styrene to 40 to 60 parts of methyl methacrylate, equally useful thermoplastic compositions are prepared.

Particularly valuable compositions are prepared from a mixture of 100 parts of polyvinyl chloride and from 5 to 15 parts of a copolymer of about 50 percent alpha-methyl styrene and 50 percent methyl methacrylate. These compositions have higher softening points than those obtained when styrene-methyl methacrylate is employed in such compositions, but are otherwise as useful and possess outstanding physical and chemical properties, and are particularly resistant to the action of corrosive chemicals. Likewise useful products are obtained from other polyvinyl halide and styrene-alkylmethacrylate interpolymer mixtures as described.

The impact resistance of the novel polymer compositions of this invention may be improved by incorporating into the polyvinyl chloride styrene-methyl methacrylate polymer mixture a rubbery interpolymer of a monomer mixture comprising 50 to 90 weight percent 1,3-butadiene hydrocarbon, 5 to 30 weight percent of acrylonitrile and 5 to 30 weight percent of at least one other monoolefinic monomer copolymerizable with the 1,3-butadiene hydrocarbon and acrylonitrile, preferably styrene or substituted styrenes of the types described hereinabove. The amount of rubbery interpolymer ordinarily employed is from 1 to 25 weight parts based on 100 weight parts, and preferably about 5 to 15, of the other two polymeric materials. The preferred interpolymer is prepared from a monomer mixture containing 60 to 70 weight percent 1,3-butadiene, 15 to 20 weight percent acrylonitrile and 15 to 20 weight percent styrene. The rubbery interpolymers may be prepared by any of the polymerization techniques known to and used by those skilled in the art but emulsion polymerization is preferred. The interpolymer may be employed as the dry solid polymer, as a solution, a dispersion, a latex and the like. A conversion of monomers to polymer of between 50 and 100 percent is preferred. The interpolymer is preferably polymerized to a Mooney value of about 25 to 150 ML and more preferably from about 50 to 100 ML. Useful rubbery interpolymers include those wherein methacrylonitrile and the like are substituted in whole or in part for acrylonitrile, and those wherein the other monoolefinic monomer is a vinylidene compound containing the group $CH_2=C<$, including preferably the styrenes, alkyl acrylates and alkyl methacrylates. The polymer ingredients, including the rubbery interpolymer, may be mixed in any conventional form, either wet or dry. One preferred method is to blend the two polymer resins by mixing the dry resin powder and masticating with heat until a homogeneous sheet is formed, and thereafter adding the rubbery interpolymer to this mixture. Regardless of the method by which the initial blend of the three polymers is accomplished, it is preferred that the blended polymers be worked or masticated under heat and pressure to insure efficient dispersion of the various ingredients in the mixture. In general temperatures of from about 200° F. to about 400° F. are sufficient to accomplish efficient homogenization of the polymers.

To illustrate the preparation of these improved impact compositions, a mixture of 100 parts of polyvinyl chloride with 5 and 10 parts each of a copolymer of a monomer mixture of 50 parts each of styrene and methyl methacrylate are formed into a sheet on a mill at about 300° F., and 5 and 10 parts each of a rubbery interpolymer made by polymerizing in aqueous emulsion a monomer mixture of 67 parts 1,3-butadiene, 16 parts acrylonitrile and 17 parts styrene having a Mooney value of 70 ML are intimately mixed therewith. The resulting product is sheeted off the mill and molded in standard test molds for 5 minutes under pressure at 345° F. The following stress-strain results are obtained on the rigid products:

| Physical Properties | 5 Parts—Rubbery Interpolymer | 10 Parts—Rubbery Interpolymer |
|---|---|---|
| Tensile Strength, p. s. i | 4,500 | 4,300 |
| Flexural Strength, p. s. i | 9,500 | 9,600 |
| Izod Impact, ft. lbs./in | 3.0 | 3.0 |
| Sag Temperature, °F | 160 | 160 |

Definite improvement in the Izod impact is apparent from the above data. Portions of the rubbery interpolymer-resin mixture may be extruded into rigid rods, pipes, formed into sheets and the like. The extrusion properties of the mixture are excellent. When other rigid vinyl chloride resins, other styrene-alkyl methacrylate polymers and other rubbery interpolymers of the types described are similarly employed, other useful products which possess a good balance of physical properties are obtained.

Compounding ingredients such as extenders, stabilizers, colors, fillers, small amounts of plasticizer and the like may be employed in preparing the compositions of this invention, as is well understood in the art.

While certain embodiments of the invention have been disclosed herein, it is not desired or intended to limit the invention solely thereto, for as has been disclosed, the materials, portions, and methods may be varied within critical limits and equivalents may be employed without departing from the scope and spirit of the invention as defined in the appended claims, and it is to these only that the invention is intended to be limited.

I claim:

1. A thermoplastic composition comprising a homogeneous mixture of a vinyl halide polymer of a monomeric material in which each constituent contains a single olefinic double bond and which contains at least 50% vinyl halide, and a hard resinous interpolymer of a monoolefinic monomeric mixture comprising about 60 to 40 weight percent of a monomer selected from the class consisting of styrene, chlorostyrene, dichlorostyrene, vinyl toluene, alpha-methyl styrene and methoxy styrene and from about 40 to 60 weight percent of an alkyl methacrylate, said hard resinous interpolymer containing less than 20 weight percent of other polymerized monoolefinic monomers and having a molecular weight at least about 40,000 said composition containing from 1 to 40 weight parts of said hard resinous interpolymer based on 100 weight parts of said vinyl halide polymer.

2. The thermoplastic composition of claim 1 wherein the vinyl halide polymer is polyvinyl chloride and the alkyl group of the alkyl methacrylate contains 1 to 6 carbon atoms.

3. A hard, tough, rigid, processable, thermoplastic resinous composition comprising a homogeneous mixture of a vinyl chloride polymer comprised predominantly of polymerized vinyl chloride with lesser amounts of other polymerized monoolefinic monomers and a hard resinous interpolymer of about 60 to 40 weight percent styrene and about 40 to 60 weight percent of an alkyl methacrylate, said interpolymer having a molecular weight of at least about 40,000, and said resinous composition containing from about 1 to about 40 weight parts of styrene-alkyl methacrylate interpolymer based on 100 weight parts of vinyl chloride polymer.

4. A hard, tough, rigid, processable, thermoplastic resinous composition comprising a homogeneous mixture of polyvinyl chloride and a hard resinous interpolymer of about 60 to 40 weight percent styrene and about 40 to 60 weight percent methyl methacrylate, said interpolymer having a molecular weight of at least about 40,000, and said resinous composition containing from about 5 to about 20 weight parts of styrene-methyl methacrylate interpolymer based on 100 weight parts of polyvinyl chloride.

5. A hard, tough, rigid, processable, thermoplastic resinous composition comprising a homogeneous mixture of polyvinyl chloride having a molecular weight above about 40,000 and a hard resinous copolymer of about 50 weight percent styrene and about 50 weight percent methyl methacrylate, having a molecular weight of at least about 40,000, said resinous composition containing about 5 to 15 weight parts of styrene-methyl methacrylate copolymer based on 100 weight parts of polyvinyl chloride.

6. A hard, tough, rigid, processable, thermoplastic resinous composition comprising a homogeneous mixture of polyvinyl chloride and a hard resinous copolymer of about 50 weight percent alpha-methyl styrene and about 50 weight percent methyl methacrylate, having a molecular weight of at least about 40,000, said resinous composition containing about 5 to 15 weight parts of alpha-methyl styrene-methyl methacrylate copolymer based on 100 weight parts of polyvinyl chloride.

7. A hard, tough, rigid, processable, thermoplastic composition comprising a homogeneous mixture of (1) a vinyl halide polymer comprising at least 50% of polymerized vinyl halide with lesser amounts of other polymerized monoolefinic monomers, (2) a hard, resinous interpolymer of a monoolefinic monomeric mixture comprising about 60 to 40 weight percent of a monomer selected from the class consisting of styrene, chlorostyrene, dichlorostyrene, vinyl toluene, alpha-methyl styrene and methoxy styrene and about 40 to 60 weight percent of an alkyl methacrylate, said resinous interpolymer having a molecular weight of at least about 40,000, and (3) a rubbery interpolymer of a monomeric mixture comprising 50 to 90 weight percent of a 1,3-butadiene hydrocarbon, 5 to 30 weight percent acrylonitrile and 5 to 30 weight percent of at least one other monoolefinic monomer polymerizable with the 1,3-butadiene hydrocarbon and acrylonitrile, said thermoplastic composition containing essentially from 1 to 40 weight parts of (2) based on 100 weight parts of vinyl halide polymer (1) and about 1 to 25 weight parts of (3) based on 100 weight parts of (1) and (2).

8. The thermoplastic composition of claim 7 wherein (1) is polyvinyl chloride, (2) is about 5 to 20 weight parts of an interpolymer of 60 to 40 weight percent styrene and 40 to 60 weight percent methyl methacrylate and (3) is about 5 to 15 weight parts of a rubbery interpolymer of 60 to 70 weight percent 1,3-butadiene, 15 to 20 weight percent acrylonitrile and 15 to 20 weight percent styrene.

9. A hard, tough, rigid, processable, thermoplastic resinous composition comprising a homogeneous mixture of (1) polyvinyl chloride, (2) a hard resinous interpolymer of 60 to 40 weight percent styrene and 40 to 60 weight percent methyl methacrylate, having a molecular weight at least about 40,000, and (3) a rubbery interpolymer of a monomer mixture comprising 60 to 70 weight percent of a 1,3-butadiene hydrocarbon, 15 to 20 weight percent acrylonitrile and 15 to 20 weight percent styrene, said thermoplastic polymeric composition containing essentially from 5 to 20 weight parts of (2) based on 100 weight parts of polyvinyl chloride and about 5 to 15 weight parts of (3) based on 100 weight parts of (1) and (2).

10. The method of improving the processing characteristics and chemical resistance of a normally hard tough and rigid vinyl halide polymer comprising predominantly a polymer of a monomeric material in which each constituent contains a single olefinic double bond and which contains at least 50% vinyl halide, which method comprises mixing with 100 weight parts of said vinyl halide polymer from 1 to 40 weight parts of a hard resinous interpolymer of a monoolefinic monomeric mixture comprising from about 60 to 40 weight percent of a monomer selected from the class consisting of styrene, chlorostyrene, dichlorostyrene, vinyl toluene, alpha-methyl styrene and methoxy styrene and about 40 to 60 weight percent of an alkyl methacrylate, said interpolymer containing less than 20 weight percent of other polymerized monoolefinic monomers and having a molecular weight of at least about 40,000, and then heating the resultant polymer mixture at a temperature of about 200° F. and 400° F. to effect fusion of said vinyl halide polymer and said hard resinous interpolymer into a homogeneous mass.

11. The method of processing normally hard, tough and unplasticized polyvinyl chloride which comprises first mixing 100 weight parts of said polyvinyl chloride with 1 to 20 weight parts of a hard resinous interpolymer of a monomeric mixture of from 60 to 40 weight percent styrene and from 40 to 60 weight percent methyl methacrylate, having a molecular weight of at least about 40,000, and masticating the resulting mixture at a temperature of about 200° F. to 400° F. to effect fusion of said polyvinyl chloride and styrene-methyl methacrylate and interpolymer into a homogeneous mass.

References Cited in the file of this patent
UNITED STATES PATENTS

| 2,598,639 | Fields et al. | May 27, 1952 |
| 2,646,417 | Jennings | July 21, 1953 |